United States Patent
Song (10) Patent No.: US 12,136,753 B2
(45) Date of Patent: Nov. 5, 2024

(54) FUEL CELL TEMPERATURE MANAGEMENT DEVICE AND FUEL CELL SYSTEM USING SAME

(71) Applicants: HYUNDAI MOTOR COMPANY, Seoul (KR); KIA CORPORATION, Seoul (KR)

(72) Inventor: Se Hoon Song, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/838,487

(22) Filed: Jun. 13, 2022

(65) Prior Publication Data
US 2022/0416277 A1    Dec. 29, 2022

(30) Foreign Application Priority Data

Jun. 25, 2021    (KR) .................... 10-2021-0083363

(51) Int. Cl.
| | |
|---|---|
| *H01M 8/04* | (2016.01) |
| *H01M 8/04029* | (2016.01) |
| *H01M 8/0432* | (2016.01) |
| *H01M 8/04746* | (2016.01) |

(52) U.S. Cl.
CPC ... *H01M 8/04768* (2013.01); *H01M 8/04029* (2013.01); *H01M 8/04358* (2013.01)

(58) Field of Classification Search
CPC ......... H01M 8/04768; H01M 8/04029; H01M 8/04358
See application file for complete search history.

(56) References Cited

U.S. PATENT DOCUMENTS

| | | | |
|---|---|---|---|
| 6,195,999 B1 | 3/2001 | Arnold et al. | |
| 2005/0130002 A1 | 6/2005 | Kuriiwa et al. | |
| 2006/0147772 A1 | 7/2006 | Takemoto | |
| 2009/0226776 A1* | 9/2009 | Kim | C25B 1/55 |
| | | | 429/515 |
| 2013/0196243 A1* | 8/2013 | Braithwaite | H01M 8/249 |
| | | | 429/440 |
| 2018/0233753 A1* | 8/2018 | Jang | H01M 8/04291 |
| 2018/0287175 A1* | 10/2018 | Lee | H01M 8/04768 |
| 2019/0181476 A1* | 6/2019 | Jeong | H01M 8/04358 |
| 2021/0135261 A1* | 5/2021 | Ikeda | H01M 8/04388 |

FOREIGN PATENT DOCUMENTS

EP    3 425 713 A2    1/2019

OTHER PUBLICATIONS

Partial European Search Report issued in corresponding European Application No. 22178416.8 dated Dec. 6, 2022.
Extended European Search Report issued in corresponding European Application No. 22178416.8 dated Jan. 25, 2023.

\* cited by examiner

*Primary Examiner* — Olatunji A Godo
(74) *Attorney, Agent, or Firm* — MORGAN, LEWIS & BOCKIUS LLP (57) ABSTRACT

The present disclosure relates to a fuel cell temperature management device and a fuel cell system using the same, the device including a temperature control valve that sets, to a first path or a second path, a circulation path of a cooling water passing through a fuel cell stack, and a controller that controls the temperature control valve based on a temperature of the cooling water.

13 Claims, 6 Drawing Sheets

FUEL CELL TEMPERATURE MANAGEMENT DEVICE AND FUEL CELL SYSTEM USING SAME

CROSS-REFERENCE TO RELATED APPLICATION

This application claims the benefit of priority to Korean Patent Application No. 10-2021-0083363, filed in the Korean Intellectual Property Office on Jun. 25, 2021, the entire contents of which are incorporated herein by reference.

TECHNICAL FIELD

The present disclosure relates to a fuel cell temperature management device for managing a temperature of a vehicle fuel cell, and a fuel cell system using the same.

BACKGROUND

Fuel cells are devices that generate electrical energy by an electrochemical reaction between oxygen and hydrogen that is fuel gas and are spotlighted as next-generation power generation devices because the fuel cells have relatively high efficiency and do not discharge pollutants as compared to a power generation method according to the related art.

When the fuel cells generate the electrical energy, an exothermic reaction occurs due to the electrochemical reaction between hydrogen and oxygen, and the heat generation of the fuel cells causes degradation of the fuel cells.

Thus, for the efficiency and stability of the fuel cells, a technology capable of controlling the temperature of the fuel cells during power generation is continuously developed.

SUMMARY

The present disclosure has been made to solve the above-mentioned problems occurring in the prior art while advantages achieved by the prior art are maintained intact.

An aspect of the present disclosure provides a fuel cell temperature management device capable of efficiently controlling the temperature of a fuel cell or a solid hydrogen storage device, and a fuel cell system using the same.

The technical aspects of the present disclosure are not limited to the aspects described above, and those skilled in the art will clearly understand other technical aspects not described from the following descriptions.

According to an aspect of the present disclosure, there is provided a fuel cell temperature management device including a temperature control valve that sets a circulation path of a cooling water passing through a fuel cell stack to a first path or a second path, and a controller that controls the temperature control valve based on a temperature of the cooling water.

In one embodiment, the first path may include a solid hydrogen storage device that supplies hydrogen to the fuel cell stack.

In one embodiment, the controller may control the temperature control valve to set the circulation path to the first path when the temperature of the cooling water is higher than an upper limit of a management temperature range.

In one embodiment, the controller may control the temperature control valve to set the circulation path to the second path when the temperature of the cooling water is within a management temperature range.

In one embodiment, in the fuel cell stack, an exothermic reaction may occur when electrical energy is generated, and in the solid hydrogen storage device, an endothermic reaction may occur when the hydrogen is supplied to the fuel cell stack.

In one embodiment, the fuel cell temperature management device may further include a bypass valve that directs the cooling water to a heater in the circulation path and blocks the cooling water from passing through the fuel cell stack when the temperature of the cooling water is lower than a lower limit of a management temperature range.

In one embodiment, the controller may further control the bypass valve to direct the cooling water to the heater in the circulation path and to block the cooling water from passing through the fuel cell stack when the temperature of the cooling water is lower than the lower limit of the management temperature range, and operate the heater.

In one embodiment, the controller may further control the bypass valve to block the cooling water from passing through the fuel cell stack and control the temperature control valve to set the circulation path to the first path when a solid hydrogen storage device stores hydrogen.

According to another aspect of the present disclosure, there is provided a fuel cell system including a fuel cell stack that receives hydrogen from a solid hydrogen storage device to generate electrical energy, a bypass valve that transfers, to one of the fuel cell stack or a heater, cooling water transferred from a cooling water pump, a temperature control valve that allows the cooling water passing through the fuel cell stack or the heater to flow into the cooling water pump or to allow the cooling water passing through the fuel cell stack or the heater to flow into the cooling water pump through the solid hydrogen storage device and a radiator, and a controller that controls the bypass valve and the temperature control valve to determine a circulation path of the cooling water based on a temperature of the cooling water passing through the fuel cell stack or the heater, the hydrogen stored in the solid hydrogen storage device, and supply of the hydrogen from the solid hydrogen storage device to the fuel cell stack.

In another embodiment, the controller may further form a first circulation path of the cooling water, including the cooling water pump, the bypass valve, the fuel cell stack, and the temperature control valve, based on the temperature of the cooling water passing through the fuel cell stack or the heater, when the fuel cell stack generates the electrical energy or generate a second circulation path of the cooling water, including the cooling water pump, the bypass valve, the fuel cell stack, the solid hydrogen storage device, the radiator, and the temperature control valve.

In another embodiment, the controller may form the first circulation path when the temperature of the cooling water passing through the fuel cell stack or the heater is within a management temperature range when the fuel cell stack generates the electrical energy.

In another embodiment, the controller may form the second circulation path when the temperature of the cooling water is higher than an upper limit of a management temperature range when the fuel cell stack generates the electrical energy.

In another embodiment, the controller may further form a circulation path of the cooling water, including the cooling water pump, the bypass valve, the heater, the solid hydrogen storage device, the radiator, and the temperature control valve, when the solid hydrogen storage device stores the hydrogen.

In another embodiment, the controller may further form a circulation path of the cooling water, including the bypass valve, the heater, and the temperature control valve, when the temperature of the cooling water passing through the fuel cell stack or the heater is lower than a lower limit of a management temperature range, and operate the heater.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 6.

Figure 1:
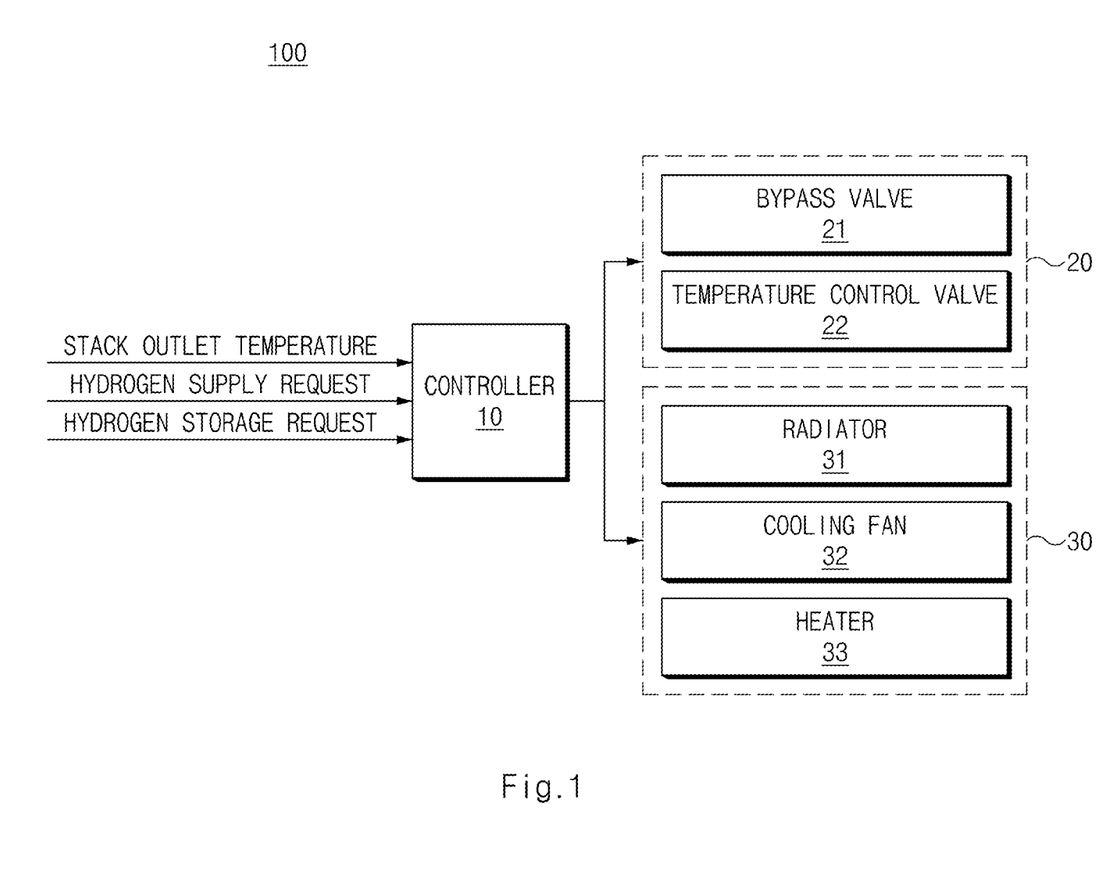
FIG. 1 is a view illustrating a configuration of a fuel cell temperature management device according to an embodiment of the present disclosure.

FIG. 1 is a view illustrating a configuration of a fuel cell temperature management device according to an embodiment of the present disclosure.

Referring to FIG. 1, a fuel cell temperature management device 100 according to an embodiment of the present disclosure may be implemented inside a vehicle. In this case, the fuel cell temperature management device 100 may be formed integrally with internal controllers of the vehicle or may be implemented as a separate device and connected to the controllers of the vehicle through a separate connection part.

Referring to FIG. 1, the fuel cell temperature management device 100 according to the embodiment of the present disclosure may include a controller 10, a flow path control device 20, and a temperature control device 30.

The controller 10 may be implemented as a processor, CPU (Central Processing Unit) or SoC (System on Chip). The controller 10 may drive an operating system or application to control a plurality of hardware components or software components connected to the controller 10.

Figure 2:
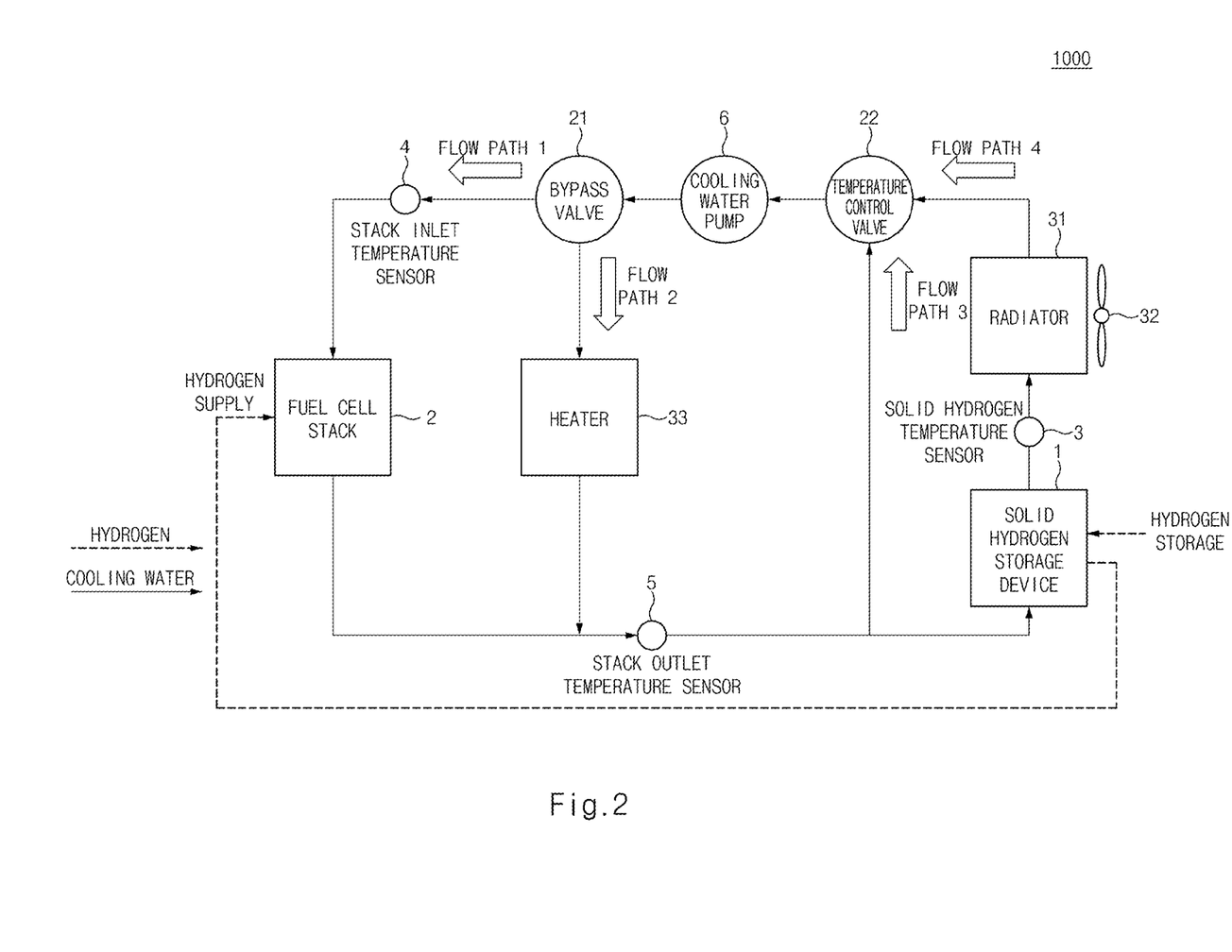
FIG. 2 is a view illustrating a configuration of a fuel cell system using the fuel cell temperature management device according to an embodiment of the present disclosure.

The controller 10 may receive the temperature (for example, a stack outlet temperature) of a cooling water passing through a fuel cell stack 2 (illustrated in FIG. 2).

The controller 10 may receive a request that occurs when hydrogen in a solid hydrogen storage device 1 (illustrated in FIG. 2) is stored or when the hydrogen stored in the solid hydrogen storage device 1 (illustrated in FIG. 2) is supplied to the fuel cell stack 2 (illustrated in FIG. 2).

The controller 10 may control the flow path control device 20 and the temperature control device 30 on the basis of the stack outlet temperature (the temperature of the cooling water passing through the fuel cell stack), a hydrogen supply request (a request generated when the hydrogen stored in the solid hydrogen storage device needs to be supplied to the fuel cell stack), and a hydrogen storage request (a request generated when the solid hydrogen storage device needs to store the hydrogen).

The flow path control device 20 may determine a circulation path of the cooling water under the control of the controller 10.

For example, the first path may include the cooling water pump 6, the bypass valve 21, the fuel cell stack 2, and the temperature control valve 22. And the second path may include the cooling water pump 6, the bypass valve 21, the fuel cell stack 2, the solid hydrogen storage device 1, the radiator 31, and the temperature control valve 22.

The flow path control device 20 may include a bypass valve 21 and a temperature control valve 22.

The temperature control device 30 may increase or decrease the temperature of the cooling water under the control of the controller 10.

The temperature control device 30 may include a radiator 31, a cooling fan 32, and a heater 33.

Description of the bypass valve 21, the temperature control valve 22, the radiator 31, the cooling fan 32, and the heater 33 will be made in FIG. 2.

FIG. 2 is a view illustrating a configuration of a fuel cell system using the fuel cell temperature management device according to an embodiment of the present disclosure.

Referring to FIG. 2, a fuel cell system 1000 may include the solid hydrogen storage device 1, the fuel cell stack 2, a solid hydrogen temperature sensor 3, a stack inlet temperature sensor 4, a stack outlet temperature sensor 5, a cooling water pump 6, the bypass valve 21, the temperature control valve 22, the radiator 31, the cooling fan 32, and the heater 33.

The fuel cell system 1000 may further include, with respect to the cooling water pump 6, a pipe that allows the cooling water to circulate to the bypass valve 21, the stack inlet temperature sensor 4, the fuel cell stack 2, the stack outlet temperature sensor 5, the solid hydrogen storage device 1, the solid hydrogen temperature sensor 3, the radiator 31, and the temperature control valve 22, a pipe that allows the cooling water to flow to the stack outlet temperature sensor 5 through the heater 33 under control of the bypass valve 21, and a pipe that allows the cooling water passing through the stack outlet temperature sensor 5 to flow into the temperature control valve 22.

Further, the fuel cell system 1000 may further include a pipe for transferring the hydrogen from the solid hydrogen storage device 1 to the fuel cell stack 20.

The solid hydrogen storage device 1 may be configured to store solid hydrogen and to supply the stored solid hydrogen to the fuel cell stack 2.

The fuel cell stack 2 may be configured so that the hydrogen provided from the solid hydrogen storage device 1 reacts with oxygen to generate electrical energy.

In this case, the fuel cell stack 2 may be configured to generate a high voltage as a plurality of unit cells are stacked and connected in series.

When the electrical energy is generated by the fuel cell stack 2, heat may be generated in the fuel cell stack 2 due to an exothermic reaction. The cooling water may prevent an increase in the temperature of the fuel cell stack 2 during power generation so that the fuel cell stack 2 is not degraded.

The solid hydrogen temperature sensor 3 may be disposed in a pipe, through which the cooing water flows between the solid hydrogen storage device 1 and the radiator 31, to measure the temperature of the solid hydrogen storage device 1.

The stack inlet temperature sensor 4 may be disposed in a pipe, through which the cooling water is supplied to the fuel cell stack 2, to detect the temperature of the cooling water supplied to the fuel cell stack 2.

The stack outlet temperature sensor 5 may be disposed in a pipe, through which the cooling water passing through the fuel cell stack 2 flows, to detect the temperature of the cooling water passing through the fuel cell stack 2.

The cooling water pump 6 may allow the cooling water to circulate through the pipe configured in the fuel cell system 1000.

For example, the cooling water pump 6 may allow the cooling water to circulate to the pipe connected to the bypass valve 21, the fuel cell stack 2, the solid hydrogen storage device 1, the radiator 31, and the temperature control valve 22.

The bypass valve 21 may allow the cooling water provided from the cooling water pump 6 to flow to the stack inlet temperature sensor 4 or to the heater 33 under the control of the controller 10 (illustrated in FIG. 1).

Hereinafter, when the cooling water flows to the stack inlet temperature sensor 4 by the bypass valve 21, it is described that the cooling water flows in a direction of flow path 1, and when the cooling water flows to the heater 33, it is described that the cooling water flows in a direction of flow path 2.

The temperature control valve 22 may receive the cooling water introduced only through the stack outlet temperature sensor 5 and the cooling water further passing through the solid hydrogen storage device 1 and the radiator 31 and mix the received cooling water to provide the mixed cooling water to the cooling water pump 6.

The temperature control valve 22 may control the amount of the cooling water introduced only through the stack outlet temperature sensor 5 and the amount of the cooling water further passing through the solid hydrogen storage device 1 and the radiator 31, to control the temperature of the cooling water provided to the cooling water pump 6, under the control of the controller 10 (illustrated in FIG. 1).

Hereinafter, it is described that the cooling water flowing to the temperature control valve 22 only through the stack outlet temperature sensor 5 flows in a direction of flow path 3, and it is described that the cooling water flowing to the temperature control valve 22 further through the solid hydrogen storage device 1 and the radiator 31 flows in a direction of flow path 4.

In this case, the controller 10 may control the bypass valve 21 so that the cooling water flows in the direction of flow path 1 or the direction of flow path 2.

Further, the temperature control valve 22 that controls the amount of the cooling water introduced in flow path 3 and the amount of the cooling water introduced in flow path 4 to provide the cooling water to the cooling water pump 6 may be controlled by the controller 10.

The radiator 31 may be configured to transfer heat of the cooling water to outside air (external air) to reduce the temperature of the cooling water.

The cooling fan 32 may be configured to provide cool air to the radiator 31 so that air heated by the radiator 31 does not stagnate.

That is, the radiator 31 and the cooling fan 32, which are devices for reducing the temperature of the cooling water, may be configured to be operated under the control of the controller 10.

When the cooling water is supplied from the bypass valve 21, the heater 33 may increase the temperature of the supplied cooling water.

In this case, the cooling water having an increased temperature may flow to the pipe connected to the temperature control valve 22 and the solid hydrogen storage device 1.

Figure 3:
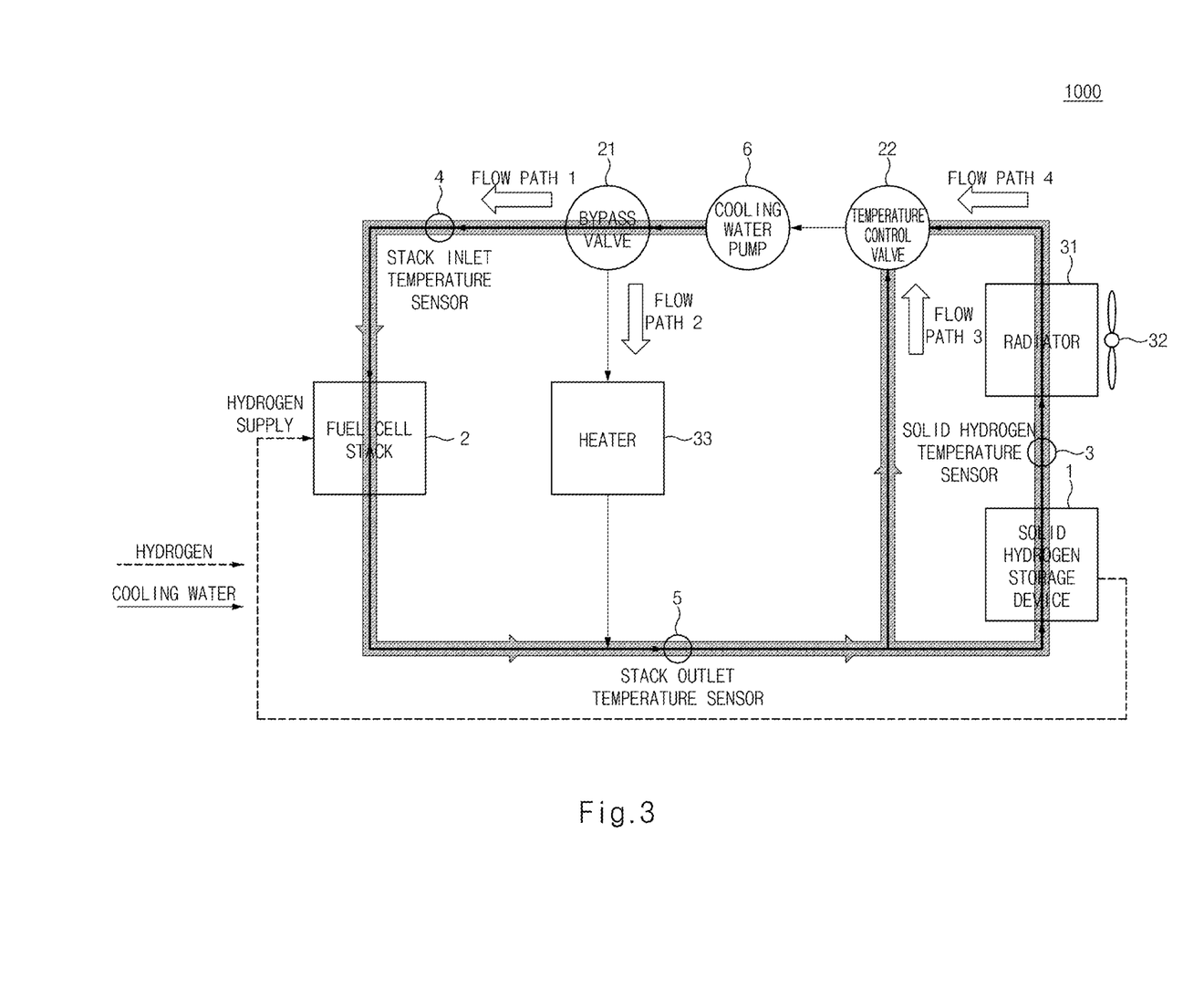
FIGS. 3 and 4 are views for describing an operation of the fuel cell system according to an embodiment of the present disclosure.
Figure 4:
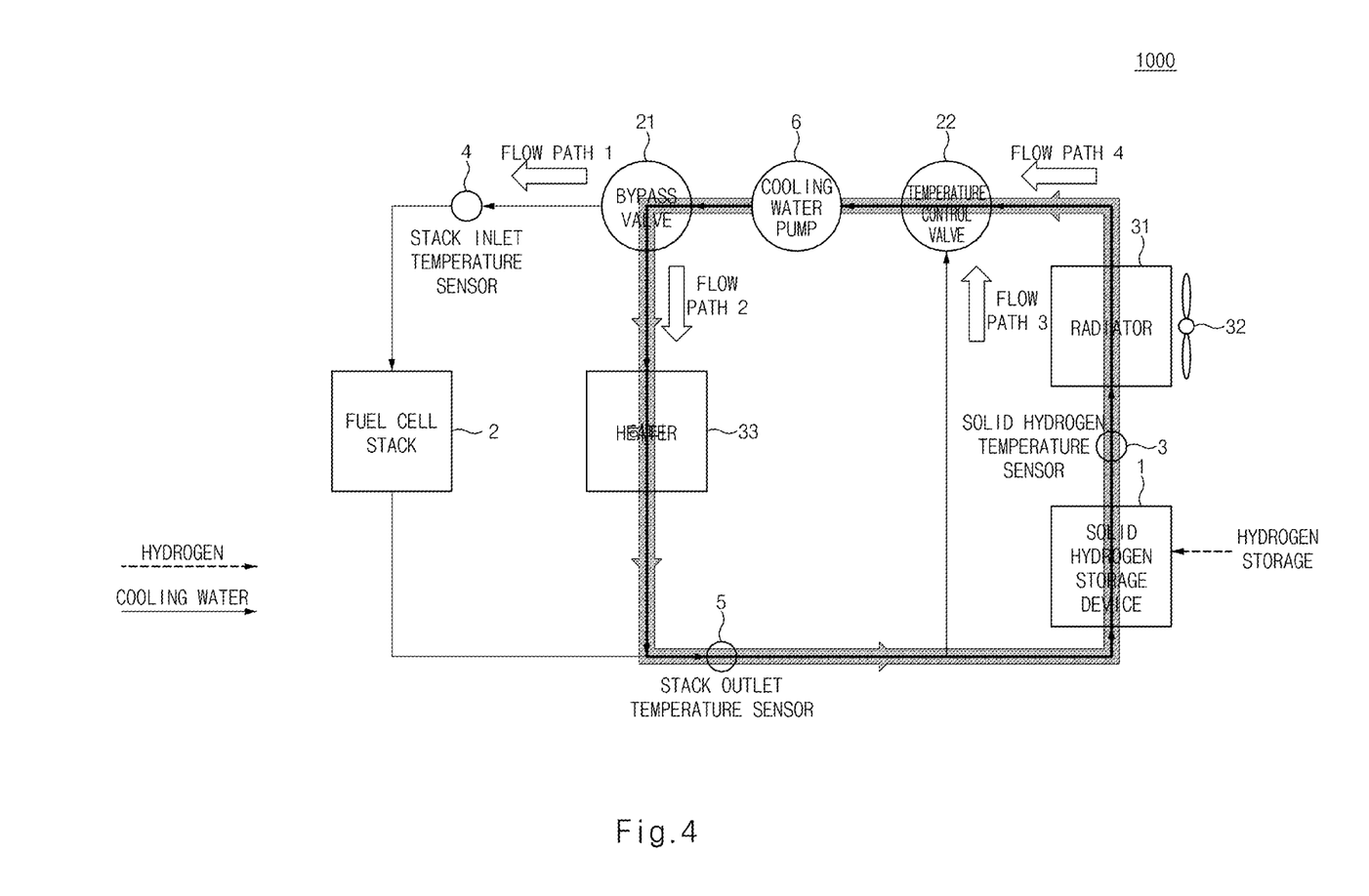

FIG. 3 and FIG. 4 are views for describing an operation of the fuel cell system according to an embodiment of the present disclosure.

FIG. 3 illustrates flow of the cooling water when the fuel cell stack 2 receives the hydrogen from the solid hydrogen storage device 1 to generate the electrical energy.

When the electrical energy is generated by the fuel cell stack 2, that is, when a request (the hydrogen supply request) to supply the hydrogen from the solid hydrogen storage device to the fuel cell stack 2 occurs, the controller 10 may control the bypass valve 21 so that the cooling water provided from the cooling water pump 6 flows to the fuel cell stack 2 (to the flow path 1).

In this case, the cooling water passing through the fuel cell stack 2 may be provided to the cooling water pump 6 again through the temperature control valve 22 (through the flow path 3).

That is, when the electrical energy is generated by the fuel cell stack 2, the controller 10 may control the bypass valve 21 so that the cooling water introduced into the bypass valve 21 flows to the flow path 1 and control the temperature control valve 22 so that the cooling water introduced from the flow path 3 is provided to the cooling water pump 6.

As a result, during power generation of the fuel cell stack 2, the cooling water may circulate through the cooling water pump 6 to pass through the bypass valve 21, the fuel cell stack 2, and the temperature control valve 22 and to be introduced into the cooling water pump 6 again.

The temperature of the fuel cell stack 2 that generates the electrical energy may be maintained within a management temperature range due to the circulation of the cooling water. In this case, the management temperature range may mean a temperature range in which the fuel cell stack 2 may normally generate the electrical energy.

When the electrical energy is generated for a long time or the amount of the electrical energy greater than a preset amount is generated, the temperature of the fuel cell stack 2 due to the heat generated by the fuel cell stack 2 cannot be maintained within the management temperature range only by the circulation of the cooling water.

The controller 10 may control whether the flow path 4 of the temperature control valve 22 is opened and an opening amount of the temperature control valve 22 on the basis of the temperature of the cooling water detected by the stack outlet temperature sensor 5, that is, the temperature of the cooling water passing through the fuel cell stack 2.

The controller 10 may open the flow path 4 of the temperature control valve 22 when the temperature of the cooling water detected by the stack outlet temperature sensor 5 is higher than a preset temperature and control an opening amount of the flow path 4 of the temperature control valve 22 according to an increase in the temperature of the cooling water to adjust the amount of the cooling water introduced from the flow path 4.

The temperature control valve 22 may mix the cooling water introduced from the flow path 3 and the cooling water introduced from the flow path 4 with each other to transfer the mixed cooling water to the cooling water pump 6.

That is, when the temperature of the cooling water passing through the fuel cell stack 2 is higher than the preset temperature, the temperature control valve 22 may mix the cooling water introduced through the fuel cell stack 2 and the cooling water introduced through the fuel cell stack 2, the solid hydrogen storage device 1, and the radiator 31 with each other to transfer the mixed cooling water to the cooling water pump 6.

The solid hydrogen storage device 1 has a characteristic that an endothermic reaction occurs when the stored hydrogen is supplied to the fuel cell stack 2.

Thus, when the cooling water having an increased temperature passes through the solid hydrogen storage device 1, the temperature of the cooling water may be reduced.

The radiator 31 may transfer the heat of the cooing water to the outside air to reduce the temperature of the cooling water.

As a result, the cooling water heated by the fuel cell stack 2 when the electrical energy is generated passes through the solid hydrogen storage device 1 and the radiator 31 so that the temperature of the cooling water may be reduced.

When the temperature control valve 22 opens the flow path 4, the temperature of the cooling water provided to the cooling water pump 6 may be lower than that when the flow path 4 is not opened.

Further, the temperature control valve 22 increases the opening amount of the flow path 4 under the control of the controller 10 as the temperature of the cooling water passing through the fuel cell stack 2 becomes greater, and thus may prevent the temperature of the cooling water transferred to the cooling water pump 6 from increasing.

In this case, when the temperature of the cooling water passing through the fuel cell stack 2 reaches an upper limit of the management temperature range, the temperature control valve 22 may increase the opening amount of the flow path 4 to the maximum.

As a result, in the fuel cell temperature management device and the fuel cell system using the same according to an embodiment of the present disclosure, when the temperature of the cooling water passing through the fuel cell stack 2 exceeds the preset temperature, a circulation path of the cooling water is changed such that the cooling water passing through the fuel cell stack 2 passes through the solid hydrogen storage device 1, and thus the temperature of the circulating cooling water may be maintained within the management temperature range.

Further, in the fuel cell temperature management device and the fuel cell system using the same according to an embodiment of the present disclosure, the temperature control valve 22 is controlled so that the amount of the cooing water passing through the solid hydrogen storage device 1 increases as the temperature of the cooling water passing through the fuel cell stack 2 increases, and thus even when the electrical energy is generated for a long time or an amount of the electrical energy greater than preset electrical energy is generated, the temperature of the circulating cooling water may be maintained within the management temperature range.

FIG. 4 illustrates flow of the cooling water when the solid hydrogen storage device 1 receives and stores the hydrogen.

Heat may be generated when the solid hydrogen storage device 1 receives the hydrogen from the outside and stores the hydrogen.

In this case, the controller 10 may control the bypass valve 21 so that the cooling water provided from the cooling water pump 6 flows to the flow path 2 (the heater 33).

Further, the controller 10 may open the flow path 4 of the temperature control valve 22 and may not operate the heater 33.

As a result, when the solid hydrogen storage device 1 receives and stores the hydrogen, a path through which the cooling water flows from the cooling water pump 6 through the bypass valve 21, the heater 33, the solid hydrogen storage device 1, the radiator 31, and the temperature control valve 22 back to the cooling water pump 6 may be formed.

Thus, the heat generated when the solid hydrogen storage device 1 stores the hydrogen may be removed by the circulating cooling water.

Further, in the fuel cell temperature management device and the fuel cell system using the same according to an embodiment of the present disclosure, when the temperature of the cooling water is lower than a lower limit of the management temperature range due to surrounding environments such as an external temperature, the controller 10 may open the flow path 2 of the bypass valve 21, open the flow path 3 of the temperature control valve 22, and operate the heater 33.

In this case, a path through which the cooling water of which the temperature is increased by the heater 33 flows from the cooling water pump 6 through the bypass valve 21, the heater 33, and the temperature control valve 22 back to the cooling water pump 6 is formed, and thus the temperature of the cooling water may be maintained within the management temperature range.

Figure 5:
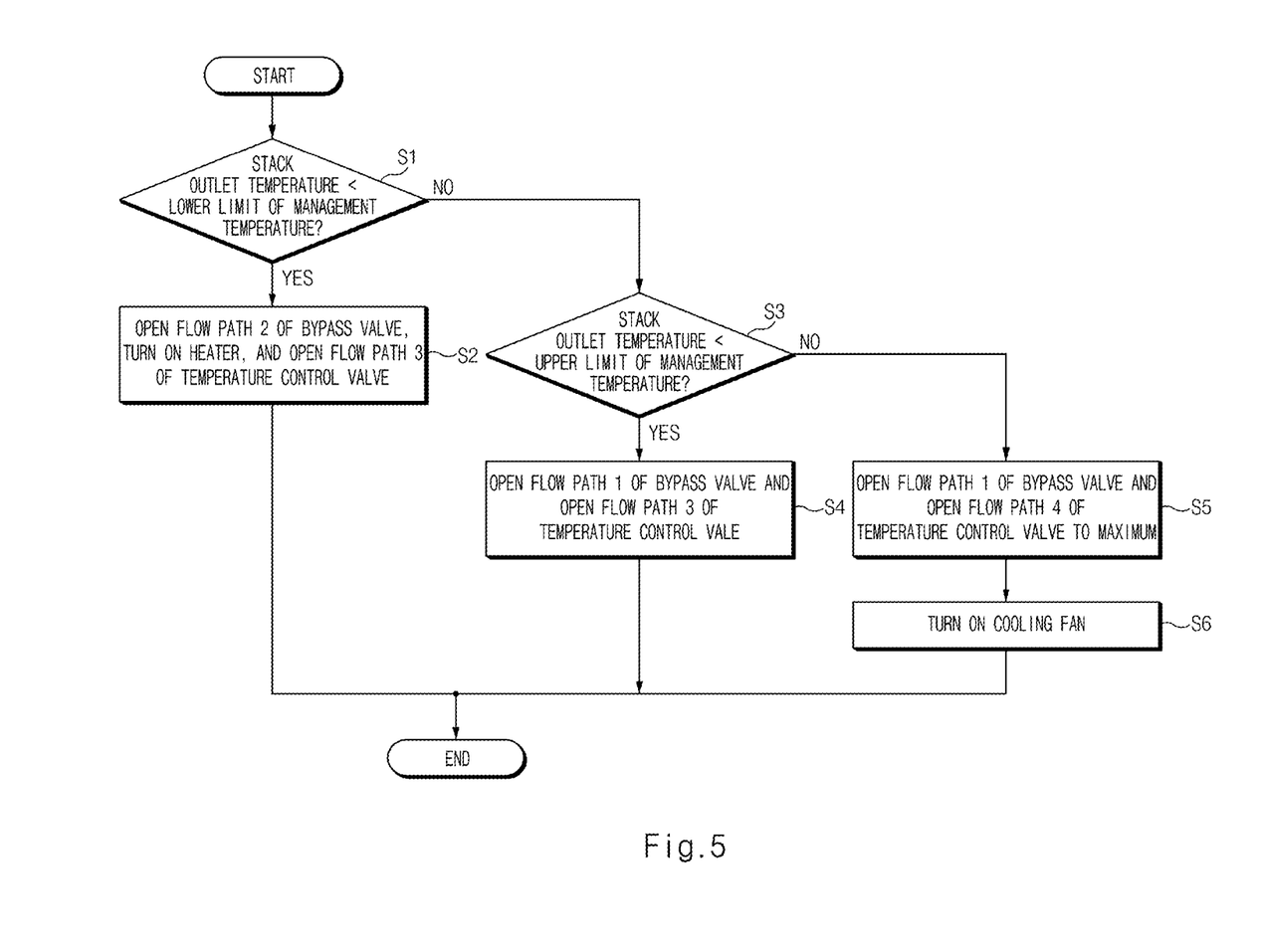
FIGS. 5 and 6 are flowcharts for describing the operation of the fuel cell system according to an embodiment of the present disclosure.
Figure 6:
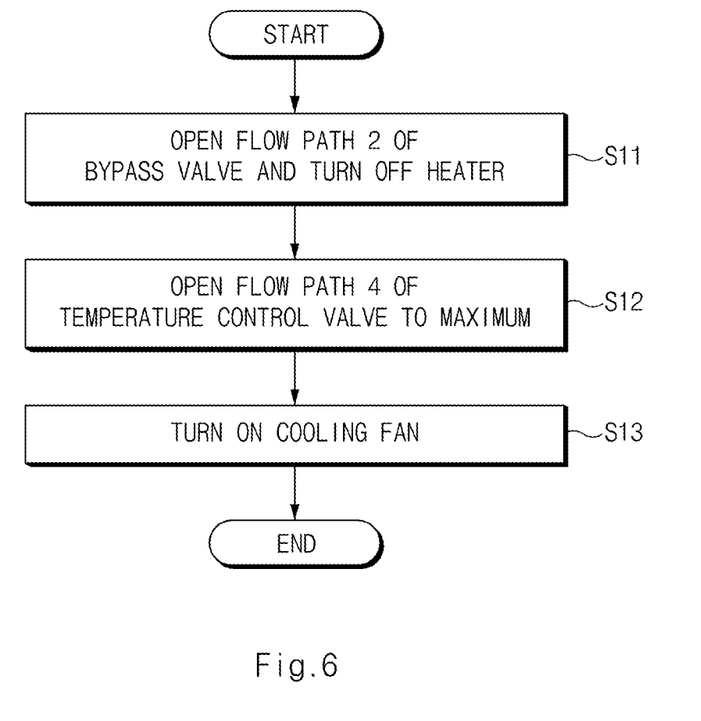

FIG. 5 and FIG. 6 are flowcharts for describing the operation of the fuel cell system according to the embodiment of the present disclosure.

FIG. 5 is a flowchart for describing an operation of the fuel cell system according to an embodiment of the present disclosure when the fuel cell stack 2 receives the hydrogen from the solid hydrogen storage device 1 to generate the electrical energy.

Referring to FIG. 5, a cooling water temperature management method for the fuel cell system according to an embodiment of the present disclosure may include a first cooling water temperature comparison operation S1, a first cooling water temperature management operation S2, a second cooling water temperature comparison operation S3, a second cooling water temperature management operation S4, a third cooling water temperature management operation S5, and a fourth cooling water temperature management operation S6.

The first cooling water temperature comparison operation S1 may include an operation of comparing the temperature (the stack outlet temperature) of the cooling water detected by the stack outlet temperature sensor 5 with the lower limit of the management temperature range.

When it is identified in the first cooling water temperature comparison operation S1 that the temperature of the cooling water is lower than the lower limit of the management temperature range (Yes), the first cooling water temperature management operation S2 may be performed.

When it is identified in the first cooling water temperature comparison operation S1 that the temperature of the cooling water is higher than the lower limit of the management temperature range (No), the second cooling water temperature comparison operation S3 may be performed.

The first cooling water temperature management operation S2 may include an operation of opening the flow path 2 of the bypass valve 21, operating the heater 33, and opening the flow path 3 of the temperature control valve 22.

In this case, the cooling water having a temperature lower than the lower limit of the management temperature range may be heated by the heater 33, and the heated cooling water may circulate in the heater 33, the temperature control valve 22, the cooling water pump 6, and the bypass valve 21. That is, the cooling water may circulate in a circulation path including the heater 33, the temperature control valve 22, cooling water pump 6, and the bypass valve 21 at a temperature within the management temperature range.

The second cooling water temperature comparison operation S3 may include an operation of comparing the temperature of the cooling water with the upper limit of the management temperature range.

When it is identified in the second cooling water temperature comparison operation S3 that the temperature of the cooling water is lower than the upper limit of the management temperature range (Yes), the second cooling water temperature management operation S4 may be performed.

When it is identified in the second cooling water temperature comparison operation S3 that the temperature of the cooling water is higher than the upper limit of the management temperature range (No), the third cooling water temperature management operation S5 may be performed.

The second cooling water temperature management operation S4 may include an operation of opening the flow path 1 of the bypass valve 21 and opening the flow path 3 of the temperature control valve 22.

In this case, the cooling water, which has a temperature that is higher than the lower limit of the management temperature range and lower than the upper limit of the management temperature range, that is, within the management temperature range, may circulate in a circulation path including the cooling water pump 6, the bypass valve 21, the fuel cell stack 2, and the temperature control valve 22.

Since the cooling water absorbs the heat generated when the fuel cell stack 2 generates the electrical energy, a state in which the temperature of the cooing water is within the management temperature range may mean that the fuel cell stack 2 operates at a temperature at which the fuel cell stack 2 may normally generate the electrical energy.

The third cooling water temperature management operation S5 may include an operation of opening the flow path 1 of the bypass valve 21 and opening the flow path 4 of the temperature control valve 22 to the maximum.

In this case, the cooling water having a temperature higher than the upper limit of the management temperature range may circulate in a circulation path including the cooling water pump 6, the bypass valve 21, the fuel cell stack 2, the solid hydrogen storage device 1, the radiator 31, and the temperature control valve 22.

The third cooling water temperature management operation S5 performed when the temperature of the cooling water is higher than the upper limit of the management temperature range may be an operation of controlling the cooling water to circulate through the solid hydrogen storage device 1 and the radiator 31 as compared to the second cooling water temperature management operation S4.

A case in which the temperature of the cooling water is higher than the upper limit of the management temperature range may correspond to a case in which the fuel cell stack 2 generates the electrical energy for a long time or the amount of the generated electrical energy is greater than the preset amount of the electrical energy.

The fuel cell stack 2 receives the stored hydrogen from the solid hydrogen storage device 1 to generate the electrical energy.

In this case, when the solid hydrogen storage device 1 provides the stored hydrogen to the fuel cell stack 2, the endothermic reaction is generated.

In the fuel cell temperature management device and the fuel cell system using the same according to an embodiment of the present disclosure, when the fuel cell stack generates the electrical energy, that is, when the solid hydrogen storage device provides the stored hydrogen to the fuel cell stack, the temperature of the cooling water is lowered due to the generated endothermic reaction of the solid hydrogen storage device, the heat of the cooling water is transferred to the outside air through the radiator 31, and thus the cooling water may be cooled so that the temperature of the cooling water is lower than the upper limit of the management temperature range.

The fourth cooling water temperature management operation S6, which is performed after the third cooling water temperature management operation S5, may include an operation of operating the cooling fan 32, so that the radiator 31 may lower the temperature of the cooling water better than when the cooling fan 32 is not operated, by circulating the outside air to the radiator 31.

FIG. 6 is a flowchart for describing an operation of the fuel cell system according to the embodiment of the present disclosure when the solid hydrogen storage device 1 receives and stores the hydrogen.

Referring to FIG. 6, a temperature management method for the fuel cell system according to the embodiment of the present disclosure when the solid hydrogen storage device stores the hydrogen may include a first path setting operation S11, a second path setting operation S12, and a cooling water cooling operation S13.

The first path setting operation S11 may include an operation of opening the flow path 2 of the bypass valve 21.

In this case, the first path setting operation S11 may further include an operation of detecting whether the heater 33 is operating and turning off the heater 33 so that the heater 33 is not operated.

The second path setting operation S12 is an operation of opening the flow path 4 of the temperature control valve 22, and in the second path setting operation S12, the opening amount of the flow path 4 opened by the temperature control valve 22 may be set to the maximum.

In this case, in the first and second path setting operations S11 and S12, a path in which the cooling water circulates through the cooling water pump 6, the bypass valve 21, the heater 33 turned off, the solid hydrogen storage device 1, the radiator 31, and the temperature control valve 22 may be formed.

The cooling water cooling operation S13 may include an operation of operating the cooling fan 32.

In this case, the cooling fan 32 is operated to circulate the outside air to the radiator 31, and thus the cooling water absorbing the heat generated by the solid hydrogen storage device 1 may dissipate the heat through the radiator 31. Thus, an increase in the temperature of the cooling water may be prevented.

In the fuel cell temperature management device and the fuel cell system using the same according to the embodiment of the present disclosure, when the fuel cell stack generates the electrical energy, the increase in the temperature of the cooling water may be prevented using the endothermic reaction of the solid hydrogen storage device, and the heat generated by the solid hydrogen storage device when the solid hydrogen storage device stores the hydrogen may be absorbed using the cooling water used to prevent the increase in the temperature of the fuel cell stack.

According to the present technology, heat generated when a fuel cell generates power may be controlled by lowering the temperature of cooling water through an endothermic reaction generated when a solid hydrogen storage device supplies hydrogen, heat generated when the solid hydrogen storage device stores the hydrogen may be lowered using the cooling water that manages the temperature of the fuel cell, and thus thermal management efficiency and power generation efficiency of a fuel cell system can be increased.

In addition, various effects directly or indirectly identified though the present specification may be provided.

The above description is merely illustrative of the technical spirit of the present disclosure, and those skilled in the art to which the present disclosure belongs may make various modifications and changes without departing from the essential features of the present disclosure.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A fuel cell temperature management device comprising:
   a temperature control valve to set a circulation path of a cooling water passing through a fuel cell stack to a heater and a solid hydrogen storage device configured to supply hydrogen to the fuel cell stack, wherein the heater and the fuel cell stack are arranged in parallel, the heater is disposed downstream of the solid hydrogen storage device; and
   a controller configured to control the temperature control valve based on a temperature of the cooling water.

2. The fuel cell temperature management device of claim 1, wherein the controller controls the temperature control valve to set the circulation path to the first path when the temperature of the cooling water is higher than an upper limit of a management temperature range.

3. The fuel cell temperature management device of claim 1, wherein the controller controls the temperature control valve to set the circulation path to the second path when the temperature of the cooling water is within a management temperature range.

4. The fuel cell temperature management device of claim 3, wherein in the fuel cell stack, an exothermic reaction occurs when electrical energy is generated, and wherein in the solid hydrogen storage device, an endothermic reaction occurs when the hydrogen is supplied to the fuel cell stack.

5. The fuel cell temperature management device of claim 1, further comprising:
   a bypass valve to direct the cooling water to the heater in the circulation path and block the cooling water from passing through the fuel cell stack when the temperature of the cooling water is lower than a lower limit of a management temperature range.

6. The fuel cell temperature management device of claim 5, wherein the controller is further configured to:
   control the bypass valve to direct the cooling water to the heater in the circulation path and to block the cooling water from passing through the fuel cell stack when the temperature of the cooling water is lower than the lower limit of the management temperature range, and operate the heater.

7. The fuel cell temperature management device of claim 5, wherein the controller is further configured to:
   control the bypass valve to block the cooling water from passing through the fuel cell stack and
   control the temperature control valve to set the circulation path to the first path when the solid hydrogen storage device stores hydrogen.

8. A fuel cell system comprising:
   a fuel cell stack to receive hydrogen from a solid hydrogen storage device to generate electrical energy;
   a bypass valve to transfer, to one of the fuel cell stack or a heater, cooling water transferred from a cooling water pump, wherein the heater and the fuel cell stack are arranged in parallel, and wherein the heater is disposed downstream of the solid hydrogen storage device;
   a temperature control valve to allow the cooling water passing through the fuel cell stack or the heater to flow into the cooling water pump or to allow the cooling water passing through the fuel cell stack or the heater to flow into the cooling water pump through the solid hydrogen storage device and a radiator; and
   a controller configured to control:
      the bypass valve and the temperature control valve to determine a circulation path of the cooling water based on a temperature of the cooling water passing through the fuel cell stack or the heater,
      the hydrogen stored in the solid hydrogen storage device, and
      supply of the hydrogen from the solid hydrogen storage device to the fuel cell stack.

9. The fuel cell system of claim 8, wherein the controller is further configured to:
   form a first circulation path of the cooling water, including the cooling water pump, the bypass valve, the fuel cell stack, and the temperature control valve, based on the temperature of the cooling water passing through the fuel cell stack or the heater, when the fuel cell stack generates the electrical energy; or
   generate a second circulation path of the cooling water, including the cooling water pump, the bypass valve, the fuel cell stack, the solid hydrogen storage device, the radiator, and the temperature control valve.

10. The fuel cell system of claim 9, wherein the controller is configured to form the first circulation path when the temperature of the cooling water passing through the fuel cell stack or the heater is within a management temperature range when the fuel cell stack generates the electrical energy.

11. The fuel cell system of claim 9, wherein the controller is configured to form the second circulation path when the temperature of the cooling water is higher than an upper limit of a management temperature range when the fuel cell stack generates the electrical energy.

12. The fuel cell system of claim 8, wherein the controller is further configured to form a circulation path of the cooling water, including the cooling water pump, the bypass valve, the heater, the solid hydrogen storage device, the radiator, and the temperature control valve, when the solid hydrogen storage device stores the hydrogen.

13. The fuel cell system of claim 8, wherein the controller is further configured to:
   form a circulation path of the cooling water, including the bypass valve, the heater, and the temperature control valve, when the temperature of the cooling water passing through the fuel cell stack or the heater is lower than a lower limit of a management temperature range, and
   operate the heater.

* * * * *